(12) United States Patent
Zhong et al.

(10) Patent No.: US 12,233,338 B1
(45) Date of Patent: Feb. 25, 2025

(54) ROBUST SPEECH AUDIO GENERATION FOR VIDEO GAMES

(71) Applicant: Electronic Arts Inc., Redwood City, CA (US)

(72) Inventors: Ping Zhong, Mountain View, CA (US); Zahra Shakeri, Newark, CA (US); Siddharth Gururani, Santa Clara, CA (US); Kilol Gupta, Redwood City, CA (US); Shahab Raji, Highland Park, NJ (US)

(73) Assignee: Electronic Arts Inc., Redwood City, CA (US)

( * ) Notice: Subject to any disclaimer, the term of this patent is extended or adjusted under 35 U.S.C. 154(b) by 753 days.

(21) Appl. No.: 17/527,533

(22) Filed: Nov. 16, 2021

(51) Int. Cl.
*A63F 13/54* (2014.01)
*G10L 13/02* (2013.01)
(Continued)

(52) U.S. Cl.
CPC .............. *A63F 13/54* (2014.09); *G10L 13/02* (2013.01); *G10L 17/04* (2013.01); *G10L 17/18* (2013.01);
(Continued)

(58) Field of Classification Search
CPC .. A63F 13/54; A63F 2300/6072; G10L 13/02; G10L 17/04; G10L 17/18; G10L 17/22; G10L 19/16
(Continued)

(56) References Cited

U.S. PATENT DOCUMENTS 11,276,410 B2 * 3/2022 Zhao ..................... G06N 3/044

FOREIGN PATENT DOCUMENTS

CN 113822017 A * 12/2021 ............. G10L 13/02
CN 114023343 B * 4/2024 ............ G10L 15/063
(Continued)

OTHER PUBLICATIONS

Tang, Huaizhen, et al. "Tgavc: Improving autoencoder voice conversion with text-guided and adversarial training." 2021 IEEE Automatic Speech Recognition and Understanding Workshop (ASRU). IEEE, 2021.*
(Continued)

*Primary Examiner* — Edwin S Leland, III
(74) *Attorney, Agent, or Firm* — Gray Ice Higdon

(57) ABSTRACT

This specification describes a computer-implemented method of training a machine-learned speech audio generation system for use in video games. The training comprises: receiving one or more training examples. Each training example comprises: (i) ground-truth acoustic features for speech audio, (ii) speech content data representing speech content of the speech audio, and (iii) a ground-truth speaker identifier for a speaker of the speech audio. Parameters of the machine-learned speech audio generation system are updated to: (i) minimize a measure of difference between the predicted acoustic features of a training example and the corresponding ground-truth acoustic features of the training example, (ii) maximize a measure of difference between the first speaker classification for the training example and the corresponding ground-truth speaker identifier of the training example, and (iii) minimize a measure of difference between the second speaker classification for the training example and the corresponding ground-truth speaker identifier of the training example.

20 Claims, 6 Drawing Sheets

(51) Int. Cl.
  *G10L 17/04* (2013.01)
  *G10L 17/18* (2013.01)
  *G10L 17/22* (2013.01)
  *G10L 19/16* (2013.01)

(52) U.S. Cl.
  CPC .............. *G10L 17/22* (2013.01); *G10L 19/16* (2013.01); *A63F 2300/6072* (2013.01)

(58) Field of Classification Search
  USPC ........................................................ 704/258
  See application file for complete search history.

(56) References Cited

FOREIGN PATENT DOCUMENTS

ES        2976722 T3 *  8/2024  ............... G06N 3/04
WO    WO-2021050130 A1 *  3/2021  ............. G06N 3/044

OTHER PUBLICATIONS

Jia, Ye et al., Transfer Learning from Speaker Verification to Multispeaker Text-To-Speech Synthesis, 32nd Conference on Neural Information Processing Systems 2018, 15 pages, dated Jan. 2, 2019.

Ganin, Yaroslav et al., Domain-Adversarial Training of Neural Networks, Journal of Machine Learning Research 17 (2016) 1-35, 35 pages, dated May 26, 2016.

Zheng, Yibin et al., Investigation of Fast and Efficient Methods for Multi-Speaker Modeling and Speaker Adaptation, Tencent Inc, China, ICASSP 2021, 5 pages, dated 2021.

* cited by examiner

ROBUST SPEECH AUDIO GENERATION FOR VIDEO GAMES

BACKGROUND

The provision of realistic speech audio is an important part of video game development. While there are various ways to generate audio, a speech audio generation system may be desirably used to generate speech audio for video games, while also enabling fine-grained control of various aspects (e.g. speaker identity, expression) of the generated speech audio.

SUMMARY

In accordance with a first aspect, this specification describes a computer-implemented method of training a machine-learned speech audio generation system for use in a video game. The training comprises: receiving one or more training examples. Each training example comprises: (i) ground-truth acoustic features for speech audio, (ii) speech content data representing speech content of the speech audio, and (iii) a ground-truth speaker identifier for a speaker of the speech audio. The training further comprises, for each of the one or more training examples: generating, by a speaker encoder, a speaker embedding. This comprises processing the ground-truth acoustic features. An expression embedding for the training example is generated by an expression encoder. This comprises processing the ground-truth acoustic features. The expression embedding is classified by an expression-speaker classifier to generate a first speaker classification. A speech content embedding is generated by a speech content encoder of a synthesizer. This comprises processing the speech content data. A combined embedding is generated. This comprises combining the speaker embedding, the expression embedding, and the speech content embedding. The combined embedding is classified by a combined-speaker classifier to generate a second speaker classification. The combined embedding is decoded by a decoder of the synthesizer to generate predicted acoustic features for the training example. Parameters of the machine-learned speech audio generation system are updated to: (i) minimize a measure of difference between the predicted acoustic features of a training example and the corresponding ground-truth acoustic features of the training example, (ii) maximize a measure of difference between the first speaker classification for the training example and the corresponding ground-truth speaker identifier of the training example, and (iii) minimize a measure of difference between the second speaker classification for the training example and the corresponding ground-truth speaker identifier of the training example.

In accordance with a second aspect, this specification describes a computing system to train a machine-learned speech audio generation system to generate predicted acoustic features for generated speech audio for use in a video game. The computing system is configured to receive one or more training examples. Each training example comprises: (i) ground-truth acoustic features for speech audio, (ii) speech content data representing speech content of the speech audio, and (iii) a ground-truth speaker identifier for a speaker of the speech audio. The training further comprises, for each of the one or more training examples: generating, by a speaker encoder, a speaker embedding. This comprises processing the ground-truth acoustic features. An expression embedding for the training example is generated by an expression encoder. This comprises processing the ground-truth acoustic features. The expression embedding is classified by an expression-speaker classifier to generate a first speaker classification. A speech content embedding is generated by a speech content encoder of a synthesizer. This comprises processing the speech content data. A combined embedding is generated. This comprises combining the speaker embedding, the expression embedding, and the speech content embedding. The combined embedding is classified by a combined-speaker classifier to generate a second speaker classification. The combined embedding is decoded by a decoder of the synthesizer to generate predicted acoustic features for the training example. Parameters of the machine-learned speech audio generation system are updated to: (i) minimize a measure of difference between the predicted acoustic features of a training example and the corresponding ground-truth acoustic features of the training example, (ii) maximize a measure of difference between the first speaker classification for the training example and the corresponding ground-truth speaker identifier of the training example, and (iii) minimize a measure of difference between the second speaker classification for the training example and the corresponding ground-truth speaker identifier of the training example.

In accordance with a third aspect, this specification describes A non-transitory computer-readable medium storing instructions which, when executed by a processor, cause the processor to: receive one or more training examples, each training example comprising: (i) ground-truth acoustic features for speech audio, (ii) speech content data representing speech content of the speech audio, and (iii) a ground-truth speaker identifier for a speaker of the speech audio; for each of the one or more training examples: generate, by a speaker encoder, a speaker embedding, comprising processing the ground-truth acoustic features; generate, by an expression encoder, an expression embedding for the training example, comprising processing the ground-truth acoustic features; classify, by an expression-speaker classifier, the expression embedding to generate a first speaker classification; generate, by a speech content encoder of a synthesizer, a speech content embedding, comprising processing the speech content data; generate a combined embedding, comprising combining the speaker embedding, the expression embedding, and the speech content embedding; classify, by a combined-speaker classifier, the combined embedding to generate a second speaker classification; decode, by a decoder of the synthesizer, the combined embedding, to generate predicted acoustic features for the training example; and update parameters of the machine-learned speech audio generation system to: (i) minimize a measure of difference between the predicted acoustic features of a training example and the corresponding ground-truth acoustic features of the training example, (ii) maximize a measure of difference between the first speaker classification for the training example and the corresponding ground-truth speaker identifier of the training example, and (iii) minimize a measure of difference between the second speaker classification for the training example and the corresponding ground-truth speaker identifier of the training example.

DETAILED DESCRIPTION

General Definitions

Figure 1:
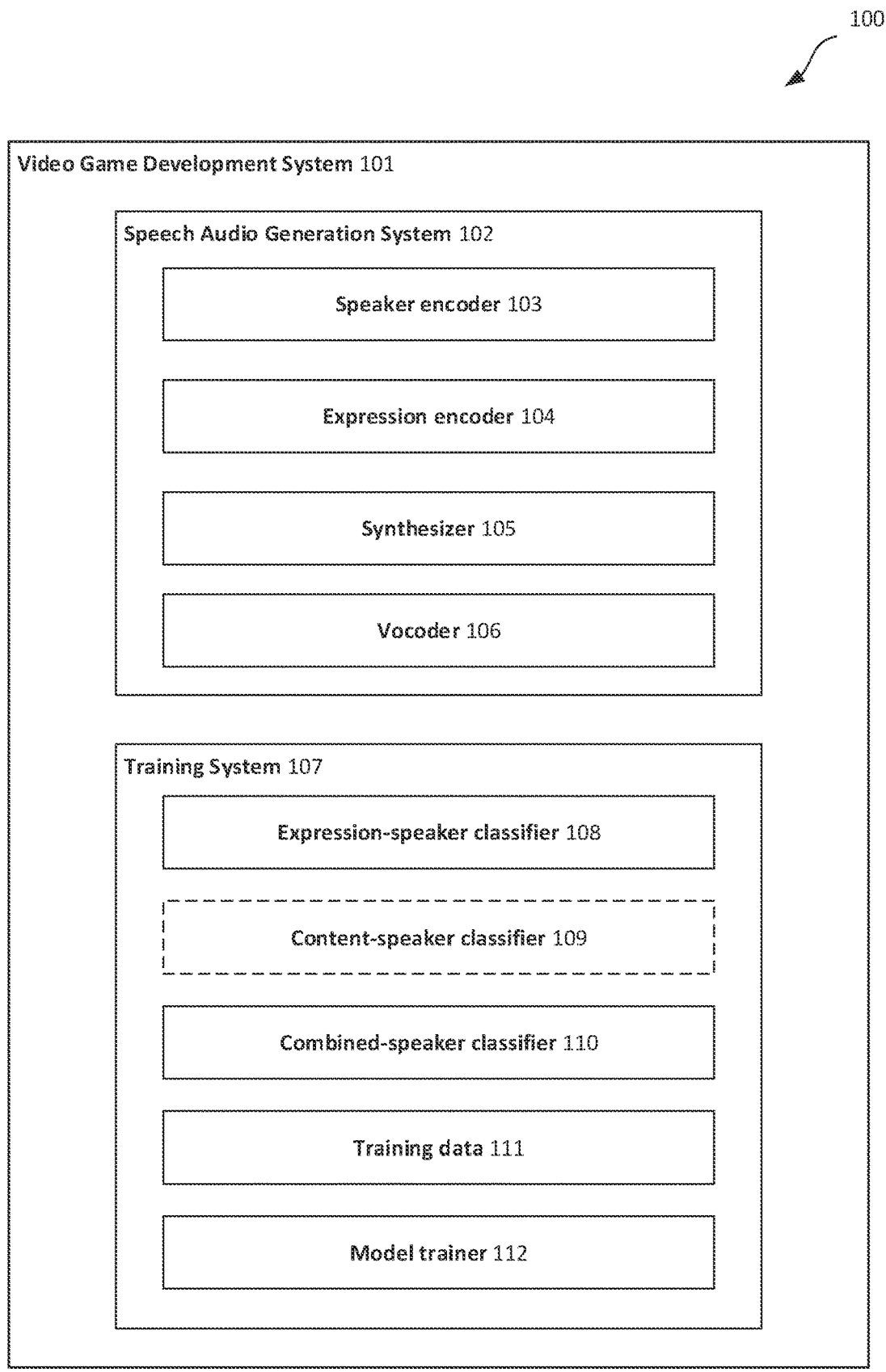
FIG. 1 is a schematic block diagram illustrating an example of a computer system for training a machine-learned speech audio generation system.

The following terms are defined to aid the present disclosure and not limit the scope thereof.

A "user" or "player", as used in some embodiments herein, refers to an individual and/or the computing system(s) or device(s) corresponding to (e.g., associated with, operated by) that individual.

A "video game" as used in some embodiments described herein, is a virtual interactive environment in which players engage.

"Speech" as used in some embodiments described herein may include sounds in the form of spoken words in any language, whether real or invented and/or other utterances including paralinguistics such as sighs, yawns, moans etc. "Speech audio" refers to audio (e.g. audio data) which includes or represents speech, and may comprise data in any suitable audio file format whether in a compressed or uncompressed format.

"Text" as used in some in embodiments described herein refers to any suitable representation of characters, words or symbols that may be used to represent language and/or speech. In some cases text may be input by use of a keyboard and/or stored in memory in the form of text data. Text may comprise text data in any suitable compressed or uncompressed format, e.g. ASCII format.

A "speech audio generation system" as used in some embodiments described herein, is a system that receives an indication of an utterance (e.g. speech content data) and outputs speech audio corresponding to the indication. Various characteristics of the output speech audio may be varied by speech audio generation system modules described herein, e.g. speech content, speaker identity, and speech expression.

"Acoustic features" as used in some embodiments described herein may include any suitable acoustic representation of frequency, magnitude and/or phase information of speech audio. For example, acoustic features may comprise linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof.

Example implementations provide systems and methods for training a machine-learned speech audio generation system. It should be understood that the speech audio generation system described herein can be used independently or in combination with other computerized and non-computerized speech audio generation approaches. In some examples, the machine-learned speech generation system is trained to predict acoustic features for generated speech audio for use in a video game. Video games often include multiple characters, with a character speaking in different styles for different scenes. As a result, it is desirable to provide a system where synthesized speech from multiple speaker identities can be generated for different characters, while being able to control the performance of a character's speech depending on the scene. Example systems and methods described in this specification allow users to generate realistic expressive speech in a desired speaker's voice.

The systems and methods described in this specification enable the training of a machine-learned speech audio generation system that learns embeddings for different aspects of speech audio (e.g. a speaker embedding representing a speaker identity, an expression embedding representing characteristics of the expression of speech audio) that more accurately capture the aspect of speech audio being represented (e.g. speech expression for an expression embedding), without capturing other aspects of speech audio (e.g. speaker identity for the expression embedding). The described systems and methods thus enable improved robustness of the representations learned by the embeddings, wherein the different aspects of speech audio represented by the different embeddings are better disentangled from each other, allowing for more flexibility and realism in speech audio that is generated using the embeddings.

In particular, the described systems and methods make use of a plurality of speaker classifiers when training the machine-learned speech audio generation system. One or more of the speaker classifiers each receive an embedding representing a particular aspect of speech audio (e.g. an expression-speaker classifier receives an expression embedding, a content-speaker classifier receives a speech content embedding) and generate a speaker classification for the embedding. The embeddings received by these speaker classifiers (which are also referred to herein as domain speaker classifiers) are intended to represent aspects of speech audio that are distinct from the speaker identity of a training example that is being processed by the machine-learned speech audio generation system during training. To achieve this, parameters of the machine-learned speech audio generation are updated to generate embeddings that cause the domain speaker classifiers to perform worse on its respective speaker classification task, e.g. by causing the domain speaker classifiers to incorrectly predict the speaker identity from the embeddings.

A combined-speaker classifier receives a combined embedding comprising a combination of embeddings, including a speaker embedding, and generates a speaker classification for the combined embedding. The combined embedding is intended to represent, in part, the speaker identity of the training example. As such, parameters of the machine-learned speech audio generation system are updated to generate a combined embedding that cause the combined-speaker classifier to perform better on its speaker classification task, e.g. by causing the speaker classifiers to correctly predict the speaker identity from the combined embedding. One or more of the embeddings used to form the combined embedding are embeddings classified by respective domain speaker classifiers. As these one or more embeddings are being learned to cause the respective domain speaker classifiers to perform worse, while causing the combined-speaker classifier to perform better, the domain speaker classifiers and the combined-speaker classifier may be considered to be adversarial training modules.

In these ways, the machine-learned speech audio generation system can be trained to generate embeddings that disentangle particular aspects of speech audio from speaker identity characteristics. For example, expression embeddings that disentangle speech expression characteristics from speaker identity characteristics can be learned, as well as speech content embeddings that disentangle speech content characteristics from speaker identity characteristics.

After training, the machine-learned speech audio generation system is used to generate speech audio in accordance with input data comprising speech content data specifying speech content for the generated speech audio, a selection of a target speaker (e.g. speech audio/acoustic features corresponding to the target speaker), and a selection of an expression style (e.g. speech audio/acoustic features corresponding to the expression style, or style tags). The generated speech audio may be stored for use in a video game application.

FIG. 1 is a schematic block diagram illustrating an example of a computer system 100 for training a speech audio generation system 102 as part of a video game development system 101. The video game development system 101 comprises a speech audio generation system 102 and a training system 107 for training components of the speech audio generation system 102. The speech audio generation system 102 is used or otherwise accessed by users when generating speech audio during a video game development process.

The speech audio generation system 102 comprises machine-learned models used to generate speech audio for video games. The speech audio generation system 102 comprises a speaker encoder 103, an expression encoder 104, a synthesizer 105, and a vocoder 106.

The speaker encoder 103 receives speech audio (or acoustic features determined therefrom) corresponding to a target speaker. The target speaker is a speaker whose voice is to be emulated in the speech audio generated by the speech audio generation system 102. The speech audio may be any suitable digital data and may for example represent a waveform of the target speech audio (e.g. by an MP3 file, a WAV file, etc.). Acoustic features may comprise any low-level acoustic representation of frequency, magnitude and phase information of speech audio such as linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof. The acoustic features may comprise a sequence of vectors, each vector representing acoustic information in a short time period, e.g. 50 milliseconds.

The speaker encoder 103 processes the speech audio (or acoustic features) and generates a speaker embedding for the target speaker. The speaker embedding is a representation of the voice of the target speaker. Generally, embeddings are vectors of a learned embedding space.

The expression encoder 104 receives speech expression data specifying expression information for the speech audio to be generated by the speech audio generation system 102. The speech expression data may comprise speech audio specifying a target speech expression. Additionally or alternatively, the speech expression data may comprise a representation of one or more style tags/tokens. For example, the expression data may comprise a weighted combination of style tokens, wherein the style tokens have been learned to reflect aspects of speech expression.

The expression encoder 104 processes the speech expression data and generates an expression embedding representing the expression information. The expression embedding may comprise a sequence of embeddings. For example, where the speech expression data comprises speech audio, an embedding may be generated for each time step of the speech audio, and an expression embedding may be formed from the embeddings of each time step. Alternatively, the expression embedding may be a single fixed-length embedding for the speech expression data.

The synthesizer 105 receives the speaker embedding, the expression embedding, and speech content data specifying speech content for the speech audio to be generated by the speech audio generation system 102. The speech content data may comprise text data. The text data may be any digital data representing text. Additionally or alternatively, the data representing speech content may comprise one or more indications of paralinguistic information. Any paralinguistic utterance may be indicated in the speech content, such as sighs, yawns, moans, laughs, grunts, etc. The speech content may be encoded by a sequence of vectors with each vector representing a character of the speech content. For example, a character may be a letter, a number, and/or a tag indicating a paralinguistic utterance. The elements of a character vector may correspond with one character out of a set of possible characters, with each character represented by a character vector with only one non-zero element (also known as a one-hot vector). Additionally or alternatively, the speech content may be represented by continuous embeddings, e.g. character embeddings and/or word embeddings.

The synthesizer 105 processes the speech content data and generates a speech content embedding. The speech content embedding may comprise a sequence of embeddings. For example, an embedding may be generated for each time step of the speech content data, and a speech content embedding may be formed from the embeddings of each time step. The synthesizer 105 combines the speaker embedding, expression embedding, and speech content embedding, and generates a combined embedding. The synthesizer 105 decodes the combined embedding and generates predicted acoustic features for the speech audio to be generated. The predicted acoustic features represent acoustic features for speech audio in the target speaker's voice with speech content as specified by the speech content data and speech expression as specified by the speech expression data.

The predicted acoustic features may comprise any low-level acoustic representation of frequency, magnitude and phase information of speech audio such as linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof. The acoustic features may comprise a sequence of vectors, each vector representing acoustic information in a short time period, e.g. 50 milliseconds.

The vocoder 106 receives the predicted acoustic features and generates generated speech audio. The generated speech audio comprises a waveform of speech audio. The generated speech audio is speech audio in the target speaker's voice with speech content as specified by the speech content data and speech expression as specified by the speech expression data.

The training system 107 is used or otherwise accessed when training components of the speech audio generation system 102. The training system 107 comprises one or more domain speaker classifiers (e.g. expression-speaker classifier 108, and optionally, content-speaker classifier 109), combined-speaker classifier 110, training data 111 comprising a plurality of training examples, and a model trainer 112.

As will be described in greater detail in relation to FIGS. 3A and 3B, during training of the speech audio generation system 102, the expression-speaker classifier 108 receives an expression embedding generated by expression encoder 104 and generates a speaker classification from processing the expression embedding. The speaker classification is a prediction of speaker identity. The speech audio generation system 102 is being trained to generate expression embeddings that represent expression information only, wherein the expression-speaker classifier 108 should not be able to accurately predict speaker identity from expression embeddings generated by expression encoder 104.

In implementations where the training system 107 comprises a content-speaker classifier 109, the content-speaker classifier receives a speech content embedding generated by the synthesizer 105 and generates a speaker classification from processing the speech content embedding. Similarly to the expression embedding, the speech audio generation system 102 may be trained to generate speech content embeddings that represent speech content information only, wherein the content-speaker classifier 109 should not be able to accurately predict speaker identity from content embeddings generated by expression encoder 104.

The combined-speaker classifier 110 receives a combined embedding generated by the synthesizer 105 and generates a speaker classification from processing the combined embedding. As the combined embedding is formed using the speaker embedding generated by speaker encoder 103, the speech audio generation system 102 is trained to generate combined embeddings wherein the combined-speaker classifier 110 should be able to accurately predict speaker identity from combined embeddings.

During training, model trainer 112 receives one or more training examples from training data 111, and processes the training examples to update parameters of the speech audio generation system 102. The model trainer 112 also updates parameters of the expression-speaker classifier 108, combined-speaker classifier 110, and if provided, the content-speaker classifier 109. The training process is described in more detail below in relation to FIGS. 3A and 3B.

Figure 2:
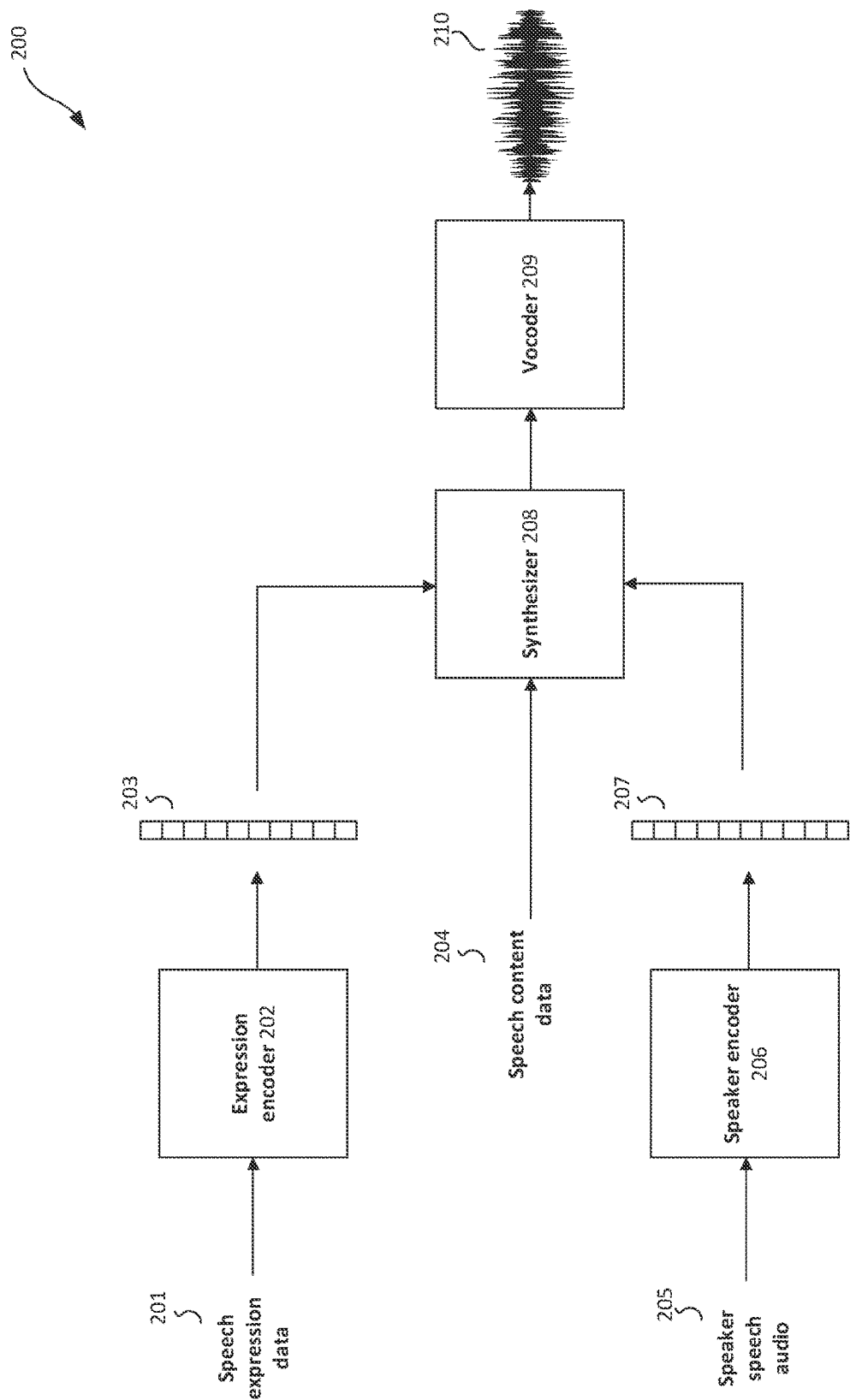
FIG. 2 illustrates an example method of generating speech audio using a machine-learned speech audio generation system.

FIG. 2 illustrates an example method 200 of generating speech audio 210 using a machine-learned speech audio generation system.

Speech expression data 201 is received by an expression encoder 202. The speech expression data 201 specifies expression information for the speech audio to be generated by the speech audio generation system. The speech expression data may comprise speech audio specifying a target speech expression. Additionally or alternatively, the speech expression data may comprise a representation of one or more style tags/tokens. For example, the expression data may comprise a weighted combination of style tokens, wherein the style tokens have been learned to reflect aspects of speech expression.

The expression encoder 202 comprises a machine-learning model that has been trained to generate an expression embedding 203 from speech expression data 201. The expression encoder 202 may comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

In some implementations, the expression encoder 202 may comprise a style token layer used to generate the expression embedding 203. A style token layer comprises an attention mechanism that generates weights for learned "style tokens" from processing speech expression data. The expression embedding 203 may be output by the style token layer by weighting each of the style tokens by its respective generated weight, and summing the weighted style tokens together. The style tokens are learned from randomly initialized tokens and capture aspects of speech expression after training the expression encoder 202.

Speech audio 205 corresponding to a target speaker, or acoustic features determined therefrom, are received by speaker encoder 206. The speech audio 205 may be any suitable digital data and may for example represent a waveform of the target speech audio (e.g. by an MP3 file, a WAV file, etc.). Acoustic features may comprise any low-level acoustic representation of frequency, magnitude and phase information of speech audio such as linear spectrograms, log-mel-spectrograms, linear predictive coding (LPC) coefficients, Mel-Frequency Cepstral Coefficients (MFCC), log fundamental frequency (LFO), band aperiodicity (bap) or combinations thereof. The acoustic features may comprise a sequence of vectors, each vector representing acoustic information in a short time period, e.g. 50 milliseconds.

The speaker encoder 206 comprises a machine-learning model that has been trained to generate a speaker embedding 207 for the target speaker corresponding to speech audio 205. The speaker encoder 206 may comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

Speech content data 204 is received by the synthesizer 208. The speech content data 204 may comprise text data. The text data may be any digital data representing text. Additionally or alternatively, the data representing speech content may comprise one or more indications of paralinguistic information. Any paralinguistic utterance may be indicated in the speech content, such as sighs, yawns, moans, laughs, grunts, etc. The speech content may be encoded by a sequence of vectors with each vector representing a character of the speech content. For example, a character may be a letter, a number, and/or a tag indicating a paralinguistic utterance. The elements of a character vector may correspond with one character out of a set of possible characters, with each character represented by a character vector with only one non-zero element (also known as a one-hot vector). Additionally or alternatively, the speech content may be represented by continuous embeddings, e.g. character embeddings and/or word embeddings.

The synthesizer 208 comprises a machine-learning model that has been trained to generate predicted acoustic features from processing the speech content data 204, expression embedding 203, and speaker embedding 207.

The synthesizer 208 comprises a speech content encoder, a combining operation, and a decoder.

The speech content encoder of the synthesizer 208 processes the speech content data 204 and generates a speech content embedding. The speech content embedding may comprise a sequence of embeddings. For example, an embedding may be generated for each time step of the speech content data, and a speech content embedding may be formed from the embeddings of each time step. The speech content encoder may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

The combining operation of the synthesizer 208 combines the expression embedding 203, speaker embedding 207, and speech content embedding, and generates a combined embedding. Where the speech content embedding comprises a sequence of embeddings, the combining operation may be configured to generate a combined embedding that also comprises a sequence of embeddings. For example, the combining operation may combine each embedding of the sequence of embeddings of the speech content embedding with both of the expression embedding 203 and the speaker embedding 207. The combining operation may comprise any binary operation resulting in a single embedding. For example, the combination operation may be performed by an addition, an averaging, a dot product, a concatenation, etc.

The expression encoder 202 and speaker encoder 206 may be configured to produce vector outputs having dimension(s) adapted for combination, during the combining operation, with the vector output(s) of the speech content encoder. For example in some embodiments the speech content encoder, the expression encoder 202, and speaker encoder 206 may generate vector outputs of the same dimension, which may be combined by a suitable operation such as addition.

The decoder of the synthesizer 208 decodes the combined embedding and generates predicted acoustic features for the speech audio to be generated. The decoder may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

In some implementations, the decoder comprises an attention mechanism. In these implementations, the combining operation generates a combined embedding comprising an embedding for each input time step of the speech content data 204, as described above. For an output time step, the attention mechanism receives the embedding of each input time step and generates attention weights for each of the embeddings. The attention mechanism averages each embedding by the respective attention weight to generate a context vector for the output time step. When decoding to produce predicted acoustic features for an output time step, the decoder decodes the context vector for the output time step.

The vocoder 209 receives the predicted acoustic features and generates generated speech audio 210. The generated speech audio 210 comprises a waveform of speech audio. The vocoder 209 may comprise a machine-learning model that has been trained to generate speech audio from acoustic features. The vocoder 209 may comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

The expression encoder 202, speaker encoder 206, and the synthesizer 208 may be trained together whereas the vocoder 209 may be trained separately to these components of the speech audio generation system.

Figure 3A:
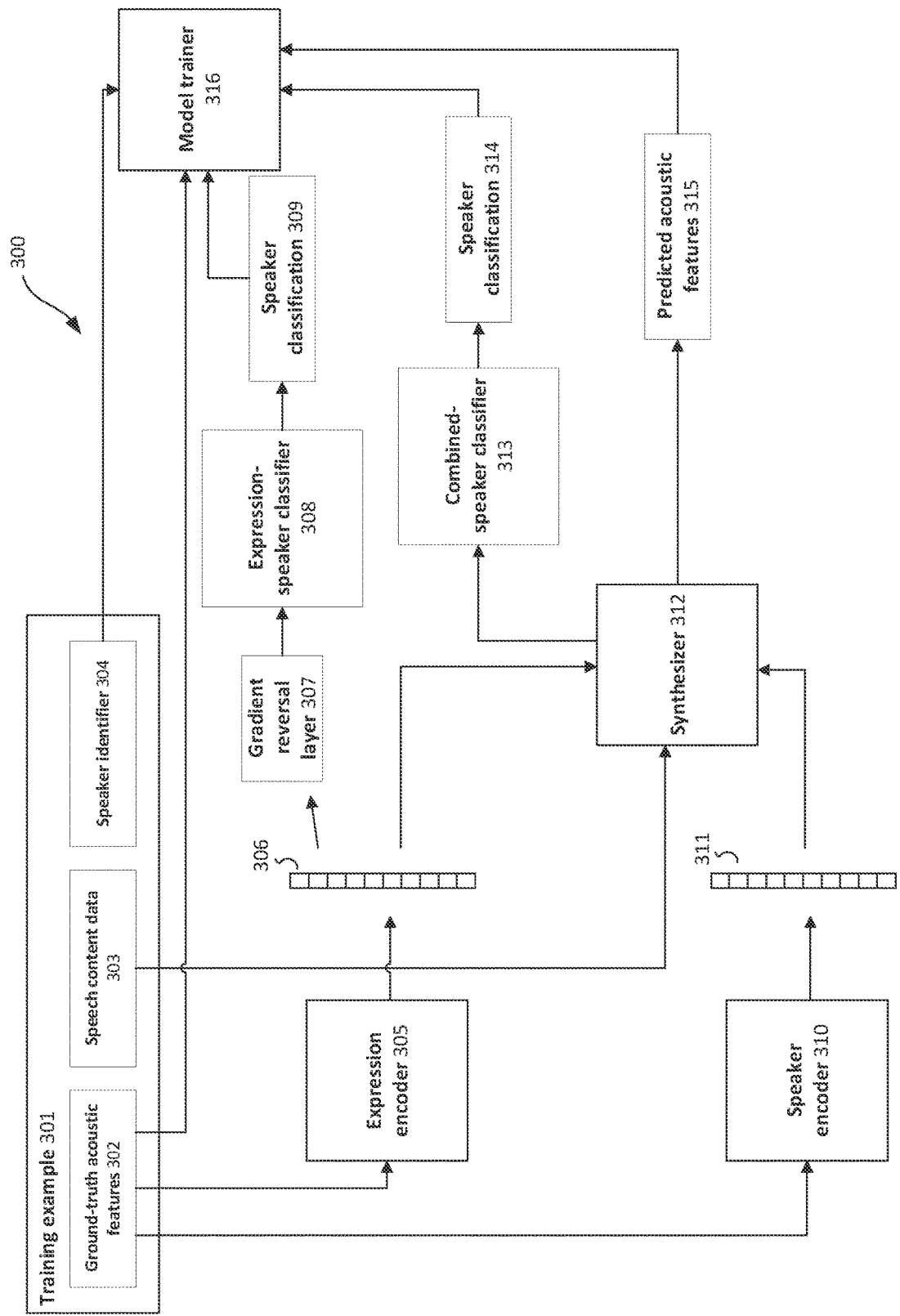
FIGS. 3A and 3B each illustrate an example method of training a machine-learned speech audio generation system.
Figure 3B:
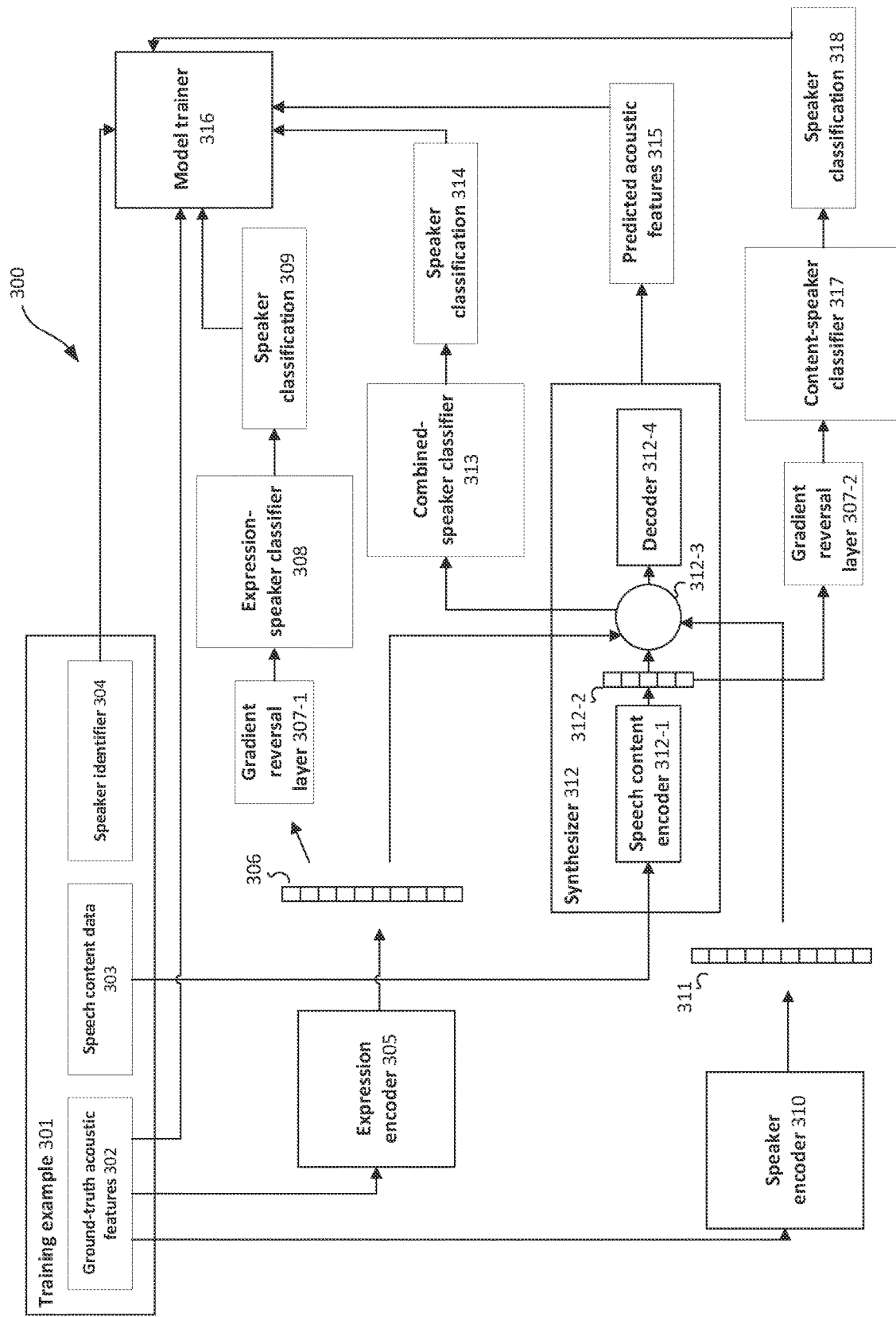

FIGS. 3A and 3B each illustrate an example method 300 of training a machine-learned speech audio generation system to predict acoustic features. The method 300 involves receiving one or more training examples 301.

Referring to FIG. 3A, each training example 301 relates to an example of speech audio. In particular, each training example 301 comprises: ground-truth acoustic features 302 determined from the example of speech audio, speech content data 303 representing the speech content of the speech audio, and a speaker identifier 304 that indicates a speaker of the speech audio. The speaker identifier 304 may comprise a one-hot vector representing a particular speaker out of a set of speakers, e.g. a set of speakers that are represented in the training examples. In general, the training examples 301 are determined from a dataset that includes a plurality of examples of recorded speech audio from each of a number of different speakers.

During training, the goal is to train the synthesizer 312 to generate predicted acoustic features 315 that closely match the ground-truth acoustic features 302 of the training example 301. In addition, the expression encoder 305 is trained to generate an expression embedding 306 that represents expression characteristics of the speech audio of the training example 301. The speaker encoder 310 is trained to generate a speaker embedding 311 that represents the speaker identity of the training example.

The expression encoder 305 processes the ground-truth acoustic features 302 of a training example 301 in accordance with a current set of parameters, and generates an expression embedding 306.

The speaker encoder 310 processes the ground-truth acoustic features 303 of the training example 301 in accordance with a current set of parameters, and generates a speaker embedding 311.

In some implementations, the speaker encoder 310 may comprise a pre-trained portion. The pre-trained portion of the speaker encoder 310 may be derived from a machine-learning model that has been trained on a separate task, such as speaker verification. For example, the machine-learning model may comprise a trained neural network, and the pre-trained portion of the speaker encoder 310 may comprise one or more neural network layers of the trained neural network (e.g. one or more layers preceding an output layer of the trained neural network). The machine-learning model may have been trained using training examples outside of the training examples 301 used to train the synthesizer 312. For example, when training a machine-learning model to perform speaker verification, it is usually not necessary to include speech content data 303. Thus the pre-trained portion of the speaker encoder 310 may be trained using speech audio provided from a larger number of speakers, enabling the speaker encoder 310 to generate more representative/suitable speaker embeddings 311 (e.g. that more accurately reflects characteristics of a speaker's voice). In these implementations, the speaker encoder 310 further comprises an adaptive portion that is being trained to generate the speaker embedding 306 from output of the pre-trained portion of the speaker encoder 310. During training, parameters of the pre-trained portion of the speaker encoder 310 may be fixed (i.e. not updated during training) while parameters of the adaptive portion may be updated.

The synthesizer 312 processes the speech content data 303 in accordance with a current set of parameters, and generates a speech content embedding. The synthesizer 312 combines the speech content embedding, expression embedding 306, and speaker embedding using a combining operation and generates a combined embedding.

An expression-speaker classifier 308 processes the expression embedding 306 in accordance with a current set of parameters and generates a speaker classification 309. During training of the speech audio generation system, the expression-speaker classifier 308 is used to provide a training signal to update parameters of the expression encoder 305. In particular, the parameters of the expression encoder 305 are updated to generate an expression embedding 306 such that the expression-speaker classifier 308 is more likely to incorrectly predict the speaker identity of the training example 301 from the expression embedding 306. At the same time, parameters of the expression-speaker classifier 308 are updated to more accurately predict the speaker identity from the expression embedding 306.

In the examples shown in FIGS. 3A and 3B, this is achieved by providing a gradient reversal layer 307-1 that first receives the expression embedding 306 before passing it on to the expression-speaker classifier 308. A gradient reversal layer is a layer that is configured to receive an input and provide the input as output of the layer during a forward pass of the training process (e.g. when predicting acoustic features 315 for a training example 301). During a backwards pass of the training process (e.g. when determining updates to parameters of the speech audio generation system), the gradient reversal layer receives gradients from a layer subsequent to the gradient reversal layer (e.g. a layer that receives the output of the gradient reversal layer during the forward pass) and multiplies the received gradients by a negative value for use in the rest of the backwards pass.

The expression-speaker classifier 308 comprises a machine-learning model being trained to generate a speaker classification 309 from the expression embedding 306. The expression-speaker classifier 308 may comprise one or more neural network layers. For example, the neural network layers may comprise feedforward layers, e.g. fully connected layers and/or convolutional layers. The neural network layers may comprise an output softmax layer that outputs a speaker classification 309 in the form of a probability vector indicating a probability for each speaker out of the set of speakers included in the training data.

The combined-speaker classifier 313 processes the combined embedding generated by the synthesizer 312 in accordance with a current set of parameters, and generates a speaker classification 314. During training of the speech audio generation system, the combined-speaker classifier 313 is used to provide a training signal to update parameters of the expression encoder 305, speaker encoder 310 and synthesizer 312. In particular, the parameters of the expression encoder 305, speaker encoder 310 and synthesizer 312 are updated to generate a combined embedding such that the combined-speaker classifier 313 is more likely to correctly predict the speaker identity of the training example 301 from the combined embedding. At the same time, parameters of the combined-speaker classifier 313 are updated to more accurately predict the speaker identity from the combined embedding.

The combined-speaker classifier 313 comprises a machine-learning model being trained to generate a speaker classification 314 from the combined embedding. The combined-speaker classifier 313 may comprise one or more neural network layers. For example, the neural network layers may comprise feedforward layers, e.g. fully connected layers and/or convolutional layers. The neural network layers may comprise an output softmax layer that outputs a speaker classification 314 in the form of a probability vector indicating a probability for each speaker out of the set of speakers included in the training data.

The synthesizer 312 processes the combined embedding in accordance with a current set of parameters and generates predicted acoustic features 315 for the training example 301.

Model trainer 316 receives the predicted acoustic features 315, ground-truth acoustic features 302, speaker classifications 309 and 314, and speaker identifier 304 and updates parameters of the expression encoder 305, speaker encoder 310, and synthesizer 312 in order to optimize an objective function.

The objective function comprises a reconstruction loss in dependence on the predicted acoustic features 315 and ground-truth acoustic features 302. The reconstruction loss measures a difference (e.g. an error) between the predicted acoustic features 315 and the ground-truth acoustic features 302. For example, the reconstruction loss may measure a mean-squared error.

The objective function further comprises a first classification loss in dependence on speaker classification 309 and speaker identifier 304. The objective function further comprises a second classification loss in dependence on speaker classification 314 and speaker identifier 304. The classification losses each measure a respective difference between the speaker classification and the speaker identifier 304. For example, the classification losses may be cross-entropy losses.

The objective function may comprise a weighted combination of the reconstruction loss, the first classification loss, and the second classification loss.

The parameters of the expression encoder 305, speaker encoder 310, and synthesizer 312 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad.

In particular, the parameters of the expression encoder 305, speaker encoder 310, and synthesizer 312 are updated to minimize the reconstruction loss, and the second classification loss. Parameters of the expression encoder 305 are updated to maximize the first classification loss. This may be achieved by including a gradient reversal layer 307-1 to provide the expression embedding 306 generated by the expression encoder 305 to the expression-speaker classifier 308, as described above.

Model trainer 316 may also use the objective function to update parameters of the expression-speaker classifier 308 and the combined-speaker classifier 313. Parameters of the expression-speaker classifier 308 may be updated to minimize the first classification loss. Parameters of the combined-speaker classifier 313 may be updated to minimize the second classification loss.

FIG. 3B illustrates additional aspects for the method 300 illustrated in FIG. 3A. FIG. 3B illustrates the synthesizer 312 as comprising a speech content encoder 312-1, which generates a speech content embedding 312-2 from processing speech content data 303 in accordance with a current set of parameters. The synthesizer 312 further comprises a combining operation 312-3 that generates a combined embedding comprising a combination of the expression embedding 306, speaker embedding 311, and speech content embedding 312-2. The synthesizer further comprises a decoder 312-4 that decodes the combined embedding in accordance with a current set of parameters to generate the predicted acoustic features 315.

In the example method illustrated in FIG. 3B, content-speaker classifier 317, is provided as an additional domain speaker classifier.

The content-speaker classifier 317 processes the speech content embedding 312-2 in accordance with a current set of parameters and generates a speaker classification 318. During training of the speech audio generation system, the content-speaker classifier 317 is used to provide a training signal to update parameters of the speech content encoder 312-1. In particular, the parameters of the speech content encoder 312-1 are updated to generate a speech content embedding 312-2 such that the content-speaker classifier 317 is more likely to incorrectly predict the speaker identity of the training example 301 from the speech content embedding 312-2. At the same time, parameters of the content-speaker classifier 317 are updated to more accurately predict the speaker identity from the speech content embedding 306.

In the example shown in FIG. 3B, this is achieved by providing a gradient reversal layer 307-2 that first receives the speech content embedding 312-2 before passing it on to the content-speaker classifier 317.

The content-speaker classifier 317 comprises a machine-learning model being trained to generate a speaker classification 318 from the speech content embedding 312-2. The content-speaker classifier 317 may comprise one or more neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers. The neural network layers may comprise an output softmax layer that outputs a speaker classification 318 in the form of a probability vector indicating a probability for each speaker out of the set of speakers included in the training data.

In the example method illustrated in FIG. 3B, model trainer 316 additionally receives speaker classification 318. In these embodiments, the objective function used to update parameters of the expression encoder 305, speaker encoder 310, and synthesizer 312 further comprises a third classification loss in dependence on speaker classification 318 and speaker identifier 304. The third classification loss measures a difference between speaker classification 318 and speaker identifier 304. For example, the classification loss may be a cross-entropy loss.

The objective function may comprise a weighted combination of the reconstruction loss, the first classification loss, the second classification loss, and the third classification loss.

The parameters of the expression encoder 305, speaker encoder 310, and synthesizer 312 may be updated by optimizing the objective function using any suitable optimization procedure. For example, the objective function may be optimized using gradient-based methods such as stochastic gradient descent, mini-batch gradient descent, or batch gradient descent, including momentum-based methods such as Adam, RMSProp, and AdaGrad.

In particular, the parameters of the expression encoder 305, speaker encoder 310, and synthesizer 312 are updated to minimize the reconstruction loss, and the second classification loss. Parameters of the expression encoder 305 are updated to maximize the first classification loss. This may be achieved by including a gradient reversal layer 307-1 to provide the expression embedding 306 generated by the expression encoder 305 to the expression-speaker classifier 308, as described above. Parameters of the speech content encoder 312-1 are updated to maximize the third classification loss. This may be achieved by including a gradient reversal layer 307-2 to provide the speech content embedding 312-2 generated by the speech content encoder 312-1 to the content-speaker classifier 317.

Model trainer 316 may also use the objective function to update parameters of the expression-speaker classifier 308, the combined-speaker classifier 313, and the content-speaker classifier 317. Parameters of the expression-speaker classifier 308 may be updated to minimize the first classification loss. Parameters of the combined-speaker classifier 313 may be updated to minimize the second classification loss. Parameters of the content-speaker classifier 317 may be updated to minimize the third classification loss.

The training process is repeated for a number of training examples, and is terminated at a suitable point in time, e.g. when predicted acoustic features 315 closely match ground-truth acoustic features 302. After the training process is terminated, the trained expression encoder 305, speaker encoder 310, and synthesizer 312 are used to provide a machine-learned speech audio generation system.

The machine-learned speech audio generation system further comprises a vocoder trained to generate speech audio from acoustic features. The machine-learned vocoder may comprise neural network layers. For example, the neural network layers may comprise feedforward layers, e.g. fully connected layers and/or convolutional layers. Additionally or alternatively, the neural network layers may comprise recurrent layers, e.g. LSTM layers and/or bidirectional LSTM layers.

A machine-learned vocoder is trained using training data comprising a plurality of training examples. Each training example includes acoustic features and a corresponding ground truth waveform of speech audio. The acoustic features may be determined from the ground-truth speech audio or provided from output of the trained synthesizer 312.

The vocoder may be trained in a separate training process to the example training processes illustrated in FIGS. 3A and 3B. During training, the vocoder processes the acoustic features of training examples to generate generated speech audio and its parameters are updated based on a comparison between the generated speech audio and the ground-truth speech audio. The parameters of the vocoder may be updated by optimizing an objective function and any suitable optimization procedure. For example, the objective function may be optimized using gradient-based methods such as stochastic gradient descent, mini-batch gradient descent, or batch gradient descent.

Figure 4:
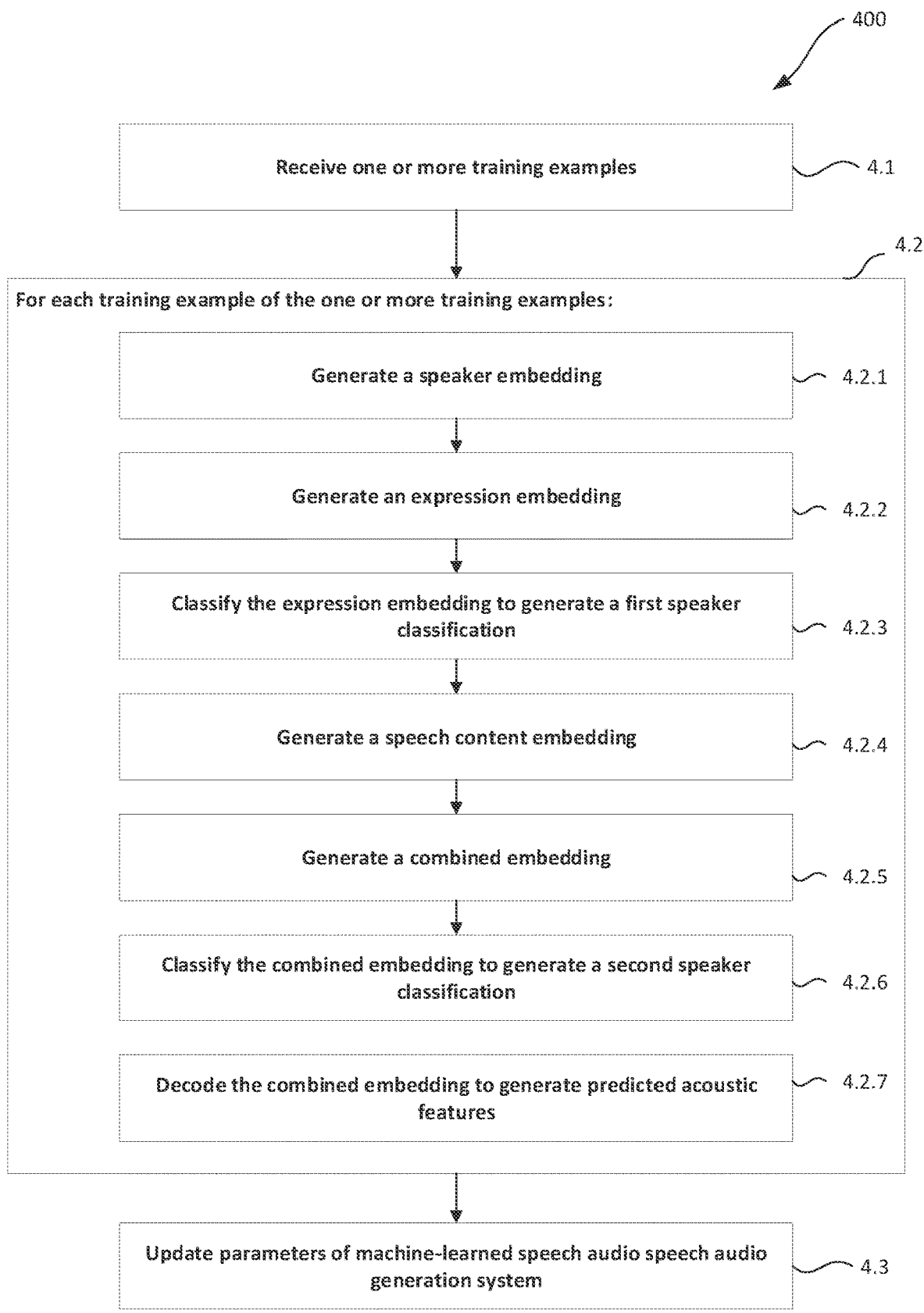
FIG. 4 is a flow diagram illustrating an example method of training a machine-learned speech audio generation system.

FIG. 4 is a flow diagram illustrating an example method 400 of training a machine-learned speech audio generation system. FIG. 4 displays a general overview of the methods described in relation to FIGS. 3A and 3B.

In step 4.1, one or more training examples are received. Each training example comprises: (i) ground-truth acoustic features for speech audio, (ii) speech content data representing speech content of the speech audio, and (iii) a ground-truth speaker identifier for a speaker of the speech audio.

Step 4.2 comprises steps 4.2.1 to 4.2.7 that are performed for each of the training examples.

In step 4.2.1, a speaker embedding is generated by a speaker encoder. This comprises processing the ground-truth acoustic features. The speaker encoder may comprise a pre-trained portion and an adaptive portion which is being trained.

In step 4.2.2, an expression embedding is generated by an expression encoder. This comprises processing the ground-truth acoustic features.

In step 4.2.3, the expression embedding is classified by an expression-speaker classifier to generate a first speaker classification. This may comprise processing the expression embedding using a gradient reversal layer that multiplies a gradient of an expression-speaker classification loss by a negative value when updating parameters of the machine-learned speech audio generation system. The expression-speaker classification loss may measure a difference between the first speaker classification for the training example and the corresponding ground-truth speaker identifier of the training example.

In step 4.2.4, a speech content embedding is generated by a speech content encoder of a synthesizer. This comprises processing the speech content data.

In step 4.2.5, combined embedding is generated. This comprises combining the speaker embedding, the expression embedding, and the speech content embedding.

In step 4.2.6, the combined embedding is classified by a combined-speaker classifier to generate a second speaker classification.

In step 4.2.7, the combined embedding is decoded by a decoder of the synthesizer to generate predicted acoustic features for the training example. The synthesizer may comprise an attention mechanism. The predicted acoustic features may comprise amplitude, frequency and phase information for generated speech audio. For example, the predicted acoustic features may comprise spectrogram parameters.

In step 4.3, parameters of the machine-learned speech audio generation system are updated. Parameters of the machine-learned speech audio generation system are updated to: (i) minimize a measure of difference between the predicted acoustic features of a training example and the corresponding ground-truth acoustic features of the training example, (ii) maximize a measure of difference between the first speaker classification for the training example and the corresponding ground-truth speaker identifier of the training example, and (iii) minimize a measure of difference between the second speaker classification for the training example and the corresponding ground-truth speaker identifier of the training example.

Updating parameters of the machine-learned speech audio generation system may comprise updating parameters of each of the expression encoder, the speaker encoder, and the synthesizer to: (i) minimize a measure of difference between the predicted acoustic features of a training example and the corresponding ground-truth acoustic features of the training example, and (ii) minimize a measure of difference between the second speaker classification for the training example and the corresponding ground-truth speaker identifier of the training example.

Updating parameters of the machine-learned speech audio generation system may comprise updating parameters of the expression encoder to maximize a measure of difference between the first speaker classification for the training example and the corresponding ground-truth speaker identifier of the training example.

In some implementations, the method 400 further comprises classifying, by a content-speaker classifier, the speech content embedding to generate a third speaker classification. The parameters of the machine-learned speech audio generation system may be further updated to maximize a measure of difference between the third speaker classification for a training example and the corresponding ground-truth speaker identifier of the training example. This may comprise processing the speech content embedding using a gradient reversal layer that multiplies a gradient of a content-speaker classification loss by a negative value when updating parameters of the machine-learned speech audio generation system. The content-speaker classification loss may measure a difference between the third speaker classification for a training example and the corresponding ground-truth speaker identifier of the training example.

Updating parameters of the machine-learned speech audio generation system may comprise updating parameters of the speech content encoder of the synthesizer to maximize a measure of difference between the third speaker classification for the training example and the corresponding ground-truth speaker identifier of the training example.

In some implementations, each training example further comprises ground-truth speech audio. The method 400 may further comprise: receiving the predicted acoustic features for a training example; generating, by a vocoder, generated speech audio, comprising processing the predicted acoustic features; and updating parameters of the vocoder to minimize a measure of difference between the generated speech audio and the corresponding ground-truth speech audio.

Figure 5:
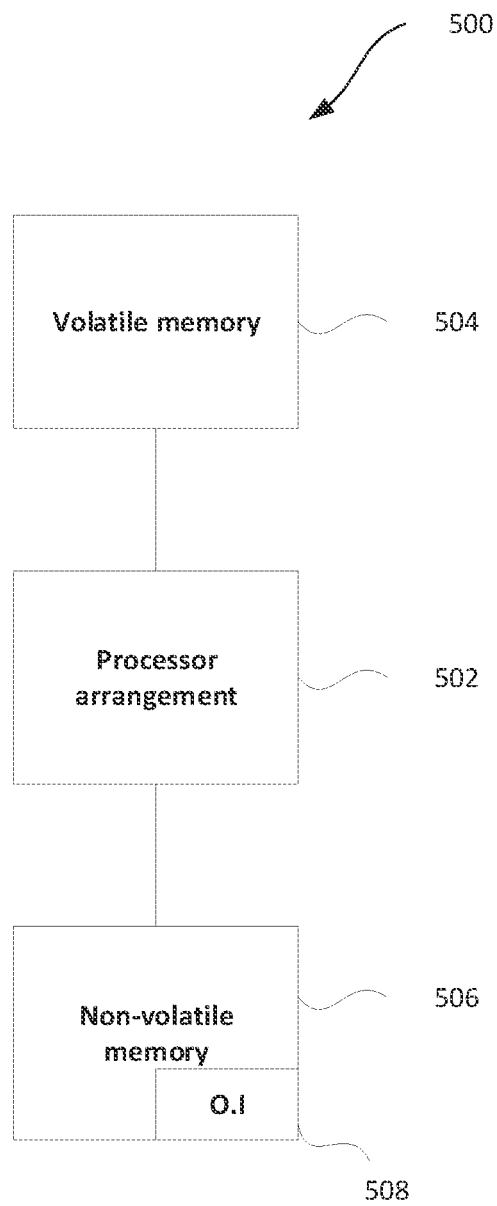
FIG. 5 shows a schematic example of a system/apparatus for performing any of the methods described herein.

FIG. 5 shows a schematic example of a system/apparatus for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 500 comprises one or more processors 502. The one or more processors control operation of other components of the system/apparatus 500. The one or more processors 502 may, for example, comprise a general purpose processor. The one or more processors 502 may be a single core device or a multiple core device. The one or more processors 502 may comprise a central processing unit (CPU) or a graphical processing unit (GPU). Alternatively, the one or more processors 502 may comprise specialised processing hardware, for instance a RISC processor or programmable hardware with embedded firmware. Multiple processors may be included.

The system/apparatus comprises a working or volatile memory 504. The one or more processors may access the volatile memory 504 in order to process data and may control the storage of data in memory. The volatile memory 504 may comprise RAM of any type, for example Static RAM (SRAM), Dynamic RAM (DRAM), or it may comprise Flash memory, such as an SD-Card.

The system/apparatus comprises a non-volatile memory 506. The non-volatile memory 506 stores a set of operation instructions 508 for controlling the operation of the processors 502 in the form of computer readable instructions. The non-volatile memory 506 may be a memory of any kind such as a Read Only Memory (ROM), a Flash memory or a magnetic drive memory.

The one or more processors 502 are configured to execute operating instructions 508 to cause the system/apparatus to perform any of the methods described herein. The operating instructions 508 may comprise code (i.e. drivers) relating to the hardware components of the system/apparatus 500, as well as code relating to the basic operation of the system/apparatus 500. Generally speaking, the one or more processors 502 execute one or more instructions of the operating instructions 508, which are stored permanently or semi-permanently in the non-volatile memory 506, using the volatile memory 504 to temporarily store data generated during execution of said operating instructions 508.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 5, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The invention claimed is:

1. A computer-implemented method of training a machine-learned speech audio generation system for use in a video game, the training comprising:
   receiving one or more training examples, each training example comprising: (i) ground-truth acoustic features for speech audio, (ii) speech content data representing speech content of the speech audio, and (iii) a ground-truth speaker identifier for a speaker of the speech audio;
   for each of the one or more training examples:
      generating, by a speaker encoder, a speaker embedding, comprising processing the ground-truth acoustic features;
      generating, by an expression encoder, an expression embedding for the training example, comprising processing the ground-truth acoustic features;
      classifying, by an expression-speaker classifier, the expression embedding to generate a first speaker classification;
      generating, by a speech content encoder of a synthesizer, a speech content embedding, comprising processing the speech content data;
      generating a combined embedding, comprising combining the speaker embedding, the expression embedding, and the speech content embedding;
      classifying, by a combined-speaker classifier, the combined embedding to generate a second speaker classification;
      decoding, by a decoder of the synthesizer, the combined embedding, to generate predicted acoustic features for the training example; and
   updating parameters of the machine-learned speech audio generation system to: (i) minimize a measure of difference between the predicted acoustic features of a training example and the corresponding ground-truth acoustic features of the training example, (ii) maximize a measure of difference between the first speaker classification for the training example and the corresponding ground-truth speaker identifier of the training example, and (iii) minimize a measure of difference between the second speaker classification for the training example and the corresponding ground-truth speaker identifier of the training example.

2. The method of claim 1, further comprising, for each of the one or more training examples:
   classifying, by a content-speaker classifier, the speech content embedding to generate a third speaker classification, wherein the parameters of the machine-learned speech audio generation system are further updated to maximize a measure of difference between the third speaker classification for a training example and the corresponding ground-truth speaker identifier of the training example.

3. The method of claim 1, wherein updating parameters of the machine-learned speech audio generation system comprises updating parameters of each of the expression encoder, the speaker encoder, and the synthesizer to: (i) minimize a measure of difference between the predicted acoustic features of a training example and the corresponding ground-truth acoustic features of the training example, and (ii) minimize a measure of difference between the second speaker classification for the training example and the corresponding ground-truth speaker identifier of the training example.

4. The method of claim 1, wherein updating parameters of the machine-learned speech audio generation system comprises updating parameters of the expression encoder to maximize a measure of difference between the first speaker classification for the training example and the corresponding ground-truth speaker identifier of the training example.

5. The method of claim 2, wherein updating parameters of the machine-learned speech audio generation system comprises updating parameters of the speech content encoder of the synthesizer to maximize a measure of difference between the third speaker classification for the training example and the corresponding ground-truth speaker identifier of the training example.

6. The method of claim 1, wherein classifying, by the expression-speaker classifier, the expression embedding to generate a first speaker classification comprises processing the expression embedding using a gradient reversal layer that multiplies a gradient of an expression-speaker classification loss by a negative value when updating parameters of the machine-learned speech audio generation system, wherein the expression-speaker classification loss measures a difference between the first speaker classification for the training example and the corresponding ground-truth speaker identifier of the training example.

7. The method of claim 2, wherein classifying, by the content-speaker classifier, the speech content embedding to generate the third speaker classification comprises processing the speech content embedding using a gradient reversal layer that multiplies a gradient of a content-speaker classification loss by a negative value when updating parameters of the machine-learned speech audio generation system, wherein the content-speaker classification loss measures a difference between the third speaker classification for a training example and the corresponding ground-truth speaker identifier of the training example.

8. The method of claim 1, wherein the speaker encoder comprises a pre-trained portion and an adaptive portion which is being trained.

9. The method of claim 1, wherein each training example further comprises ground-truth speech audio, the method comprising:
receiving the predicted acoustic features for a training example;
generating, by a vocoder, generated speech audio, comprising processing the predicted acoustic features; and
updating parameters of the vocoder to minimize a measure of difference between the generated speech audio and the corresponding ground-truth speech audio.

10. The method of claim 1, wherein one or more of the speaker encoder, the expression encoder, and the synthesizer comprises neural network layers.

11. The method of claim 9, wherein the vocoder comprises neural network layers.

12. The method of claim 1, wherein the synthesizer comprises an attention mechanism.

13. The method of claim 1, wherein the predicted acoustic features comprise amplitude, frequency and phase information for generated speech audio.

14. The method of claim 1, wherein the predicted acoustic features comprise spectrogram parameters.

15. A computing system to train a machine-learned speech audio generation system to generate predicted acoustic features for generated speech audio for use in a video game, wherein the computing system is configured to:
receive one or more training examples, each training example comprising: (i) ground-truth acoustic features for speech audio, (ii) speech content data representing speech content of the speech audio, and (iii) a ground-truth speaker identifier for a speaker of the speech audio;
for each of the one or more training examples:
generate, by a speaker encoder, a speaker embedding, comprising processing the ground-truth acoustic features;
generate, by an expression encoder, an expression embedding for the training example, comprising processing the ground-truth acoustic features;
classify, by an expression-speaker classifier, the expression embedding to generate a first speaker classification;
generate, by a speech content encoder of a synthesizer, a speech content embedding, comprising processing the speech content data;
generate a combined embedding, comprising combining the speaker embedding, the expression embedding, and the speech content embedding;
classify, by a combined-speaker classifier, the combined embedding to generate a second speaker classification;
decode, by a decoder of the synthesizer, the combined embedding, to generate predicted acoustic features for the training example; and
update parameters of the machine-learned speech audio generation system to: (i) minimize a measure of difference between the predicted acoustic features of a training example and the corresponding ground-truth acoustic features of the training example, (ii) maximize a measure of difference between the first speaker classification for the training example and the corresponding ground-truth speaker identifier of the training example, and (iii) minimize a measure of difference between the second speaker classification for the training example and the corresponding ground-truth speaker identifier of the training example.

16. The computing system of claim 15, wherein the system is further configured to, for each of the one or more training examples:
classify, by a content-speaker classifier, the speech content embedding to generate a third speaker classification, wherein the parameters of the machine-learned speech audio generation system are further updated to maximize a measure of difference between the third speaker classification for a training example and the corresponding ground-truth speaker identifier of the training example.

17. The computing system of claim 15, wherein each training example further comprises ground-truth speech audio, and the system is further configured to:
receive the predicted acoustic features for a training example;
generate, by a vocoder, generated speech audio, comprising processing the predicted acoustic features; and
update parameters of the vocoder to minimize a measure of difference between the generated speech audio and the corresponding ground-truth speech audio.

18. A non-transitory computer-readable medium storing instructions which, when executed by a processor, cause the processor to:
receive one or more training examples, each training example comprising: (i) ground-truth acoustic features for speech audio, (ii) speech content data representing speech content of the speech audio, and (iii) a ground-truth speaker identifier for a speaker of the speech audio;
for each of the one or more training examples:
generate, by a speaker encoder, a speaker embedding, comprising processing the ground-truth acoustic features;
generate, by an expression encoder, an expression embedding for the training example, comprising processing the ground-truth acoustic features;
classify, by an expression-speaker classifier, the expression embedding to generate a first speaker classification;
generate, by a speech content encoder of a synthesizer, a speech content embedding, comprising processing the speech content data;
generate a combined embedding, comprising combining the speaker embedding, the expression embedding, and the speech content embedding;
classify, by a combined-speaker classifier, the combined embedding to generate a second speaker classification;
decode, by a decoder of the synthesizer, the combined embedding, to generate predicted acoustic features for the training example; and
update parameters of a machine-learned speech audio generation system to: (i) minimize a measure of difference between the predicted acoustic features of a training example and the corresponding ground-truth acoustic features of the training example, (ii) maximize a measure of difference between the first speaker classification for the training example and the corresponding ground-truth speaker identifier of the training example, and (iii) minimize a measure of difference between the second speaker classification for the training example and the corresponding ground-truth speaker identifier of the training example.

19. The non-transitory computer-readable medium of claim 18 storing further instructions, which when executed by the processor, cause the processor to:
    classify, by a content-speaker classifier, the speech content embedding to generate a third speaker classification, wherein the parameters of the machine-learned speech audio generation system are further updated to maximize a measure of difference between the third speaker classification for a training example and the corresponding ground-truth speaker identifier of the training example.

20. The non-transitory computer-readable medium of claim 18, wherein each training example further comprises ground-truth speech audio, the non-transitory computer-readable medium storing further instructions, which when executed by the processor, cause the processor to:
    receive the predicted acoustic features for a training example;
    generate, by a vocoder, generated speech audio, comprising processing the predicted acoustic features; and
    update parameters of the vocoder to minimize a measure of difference between the generated speech audio and the corresponding ground-truth speech audio.

* * * * *